US000001205H

United States Statutory Invention Registration [19]

[11] Reg. Number: H1205

Pearce et al.

[43] Published: Jul. 6, 1993

[54] OBSCURANT APPARATUS

[75] Inventors: Horace W. Pearce, Churchville; Michael J. Burnham, Kingsville, both of Md.; John P. Schneider, Louisville, Colo.

[73] Assignee: The United States of America as represented by the Secretary of the Army, Washington, D.C.

[21] Appl. No.: 940,150

[22] Filed: Sep. 3, 1992

[51] Int. Cl.[5] ..... A01C 3/06
[52] U.S. Cl. ..... 239/654
[58] Field of Search ..... 239/654

*Primary Examiner*—David H. Brown
*Attorney, Agent, or Firm*—Anthony T. Lane; Edward Goldberg; Michael Sachs

[57] ABSTRACT

An obscurant apparatus for use in forming a smoke screen. This apparatus includes a hopper having a space for fluidizing a selective powder, an inlet jet nozzle extending through the hopper into the space, an outlet passage extending through the hopper and surrounding the inlet jet nozzle, spray means connecting to the outlet passage, and a compressed air source connecting to the jet nozzle.

8 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OBSCURANT APPARATUS

GOVERNMENTAL INTEREST

The invention described herein may be manufactured, used, and licensed by or for the Government for governmental purposes without the payment to us of any royalty thereon.

FIELD OF THE INVENTION

The invention relates to an obscurant apparatus and method, and in particular the invention relates to an obscurant apparatus having a hopper with a combined input-output pipe unit.

BACKGROUND OF THE INVENTION

The prior art obscurant apparatus includes an air-driven turbine generator, which drives an electrical generator, which drives an electrical motor, which drives a fluid pump, which drives a hydraulic motor, which actuates material in a hopper.

One problem with the prior art obscurant apparatus is that the amount of consumed energy cannot be minimized. Another problem is that the costs of maintenance, parts, repair, and the weight, cannot be minimized.

SUMMARY OF THE INVENTION

According to the present invention, an obscurant apparatus is provided. This apparatus comprises a hopper which has an axis and which has a powder chamber with a fluidizing space, a coaxial nozzle inlet pipe unit, a coaxial outlet pipe unit, a vibrator unit, a compressed air source connected directly to the nozzle inlet pipe unit, and a fluidized powder ejector.

By using the coaxial nozzle inlet pipe unit connected directly to the compressed air source, many components of the prior art apparatus can be eliminated, whereby the problem of the amount of energy consumed can be minimized, and the problem of costs of maintenance, parts, repair, and the weight, can be minimized.

The foregoing and other objects, features and advantages will be apparent from the following description of the preferred embodiment of the invention as illustrated in the accompanying drawings.

DESCRIPTION OF THE PREFERRED EMBODIMENT

Figure 1:
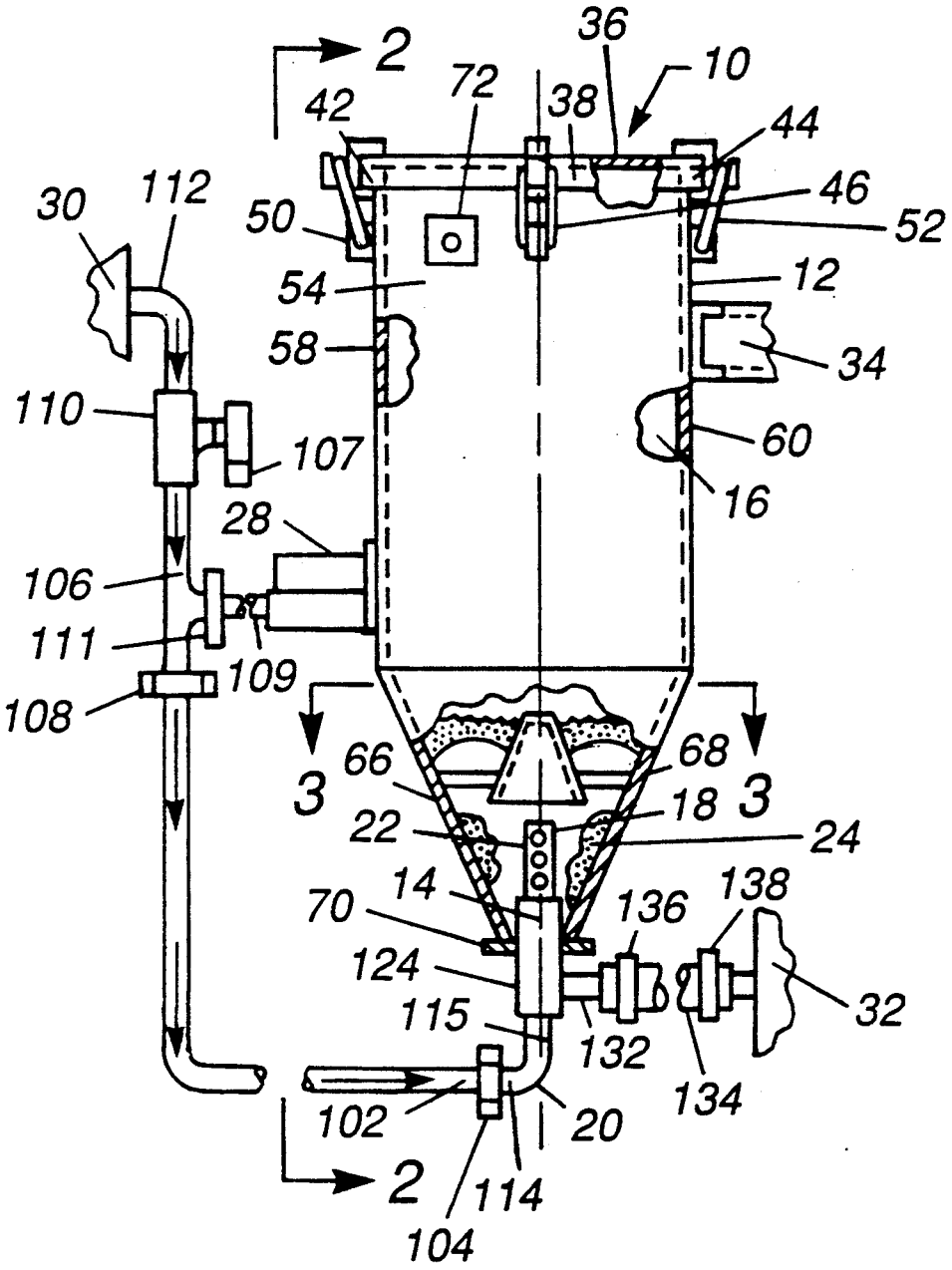
FIG. 1 is an elevation view of the apparatus according to the present invention.
Figure 2:
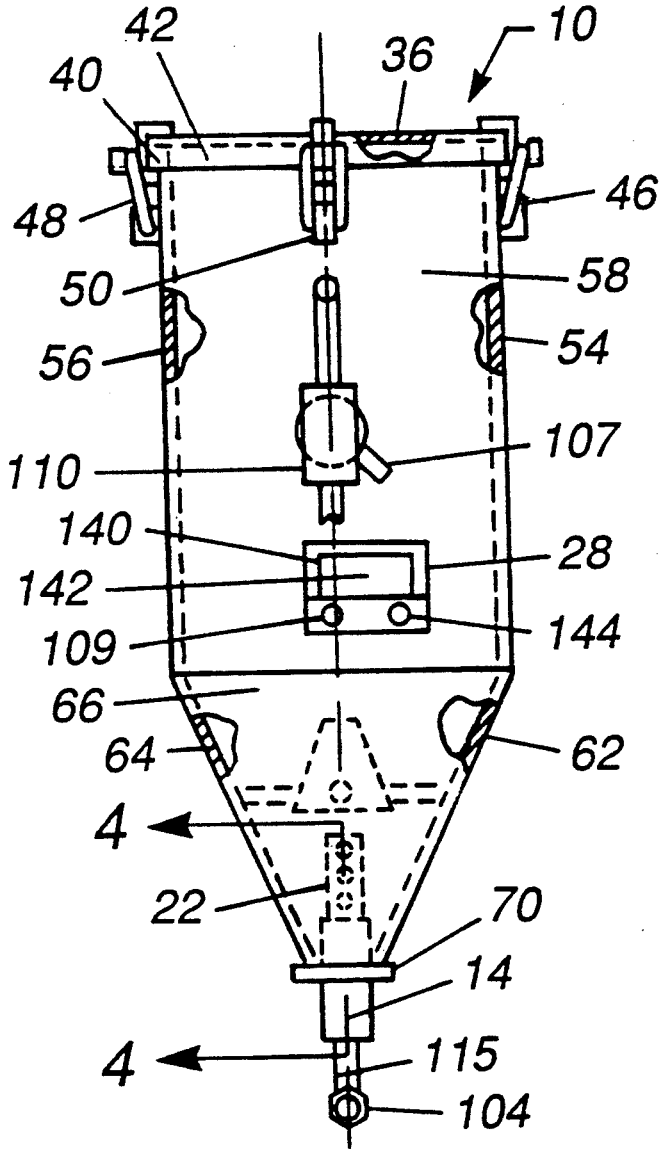
FIG. 2 is an elevation view as taken along the line 2—2 of FIG. 1.

As shown in FIGS. 1 and 2, a pneumatically operated multispectral obscurant system, or obscurant apparatus, or smoke maker 10 is provided. Apparatus 10 includes a hopper 12, which has a vertical axis 14, and which has a chamber 16 that has a fluidizing space 18. Apparatus 10 also has a nozzle inlet pipe unit 20, which has a nozzle pipe 22 that fluidizes a powder 24 that is disposed in space 18. Apparatus 10 also has an eductor or outlet pipe unit 26 which outputs the fluidized powder 24.

Apparatus 10 also has a conventional compressed air driven vibrator unit 28 for shaking down powder 24 from an upper part of chamber 16 to space 18. Apparatus 10 also has a conventional compressed air source 30, which supplies compressed air to inlet pipe unit 20 and to vibrator unit 28. Apparatus 10 also has a conventional ejector 32, which sprays out the fluidized powder therefrom to form a smoke screen. Apparatus 10 also has a conventional support beam 34, or other support, for supporting hopper 12.

Hopper 12 has a top cover or wall 36, which has a near return edge portion 38, a far edge portion 40, a leftside edge portion 42, and a rightside edge portion 44. Edge portions 38, 40, 42, 44 respectively have a near latch 46, a far latch 48, a leftside latch 50, and a right side latch 52, which are like conventional steamer trunk latches. Hopper 12 also has a near vertical wall 54, a far vertical wall 56, a leftside vertical wall 58, and a rightside vertical wall 60. Leftside vertical wall 58 supports the vibrator unit 28.

Hopper 12 also has a near inclined wall 62, a far inclined wall 64, a leftside inclined wall 66, and a rightside inclined wall 68. Hopper 12 also has a bottom wall 70. Vertical walls, 54, 56, 58, 60 and inclined walls 62, 64, 66, 68 are each one-eighth inch thickness aluminum plate and have seam welds along their adjoining edges. Walls 36 and 70 have a similar construction. Vertical wall 54 has an overpressure relief valve 72 for relieving overpressure in chamber 16. Powder 24 is a conventional powder material, or particulate material, of selective density, for making a smoke screen, as desired.

Figure 3:
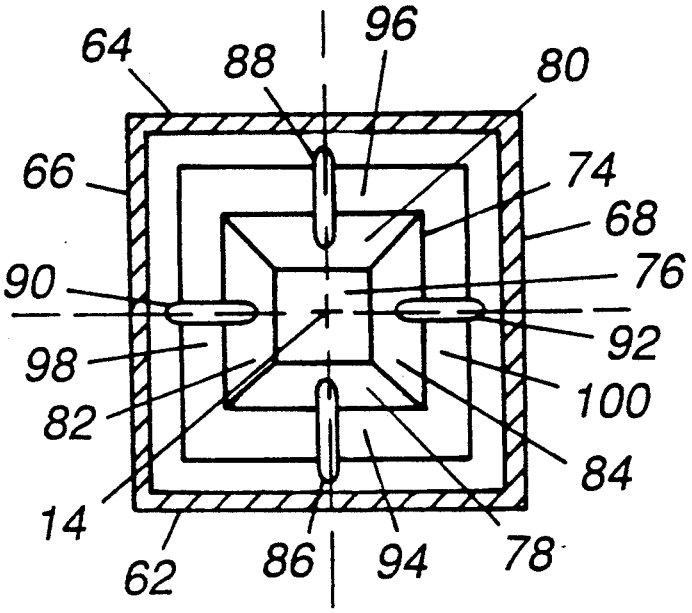
FIG. 3 is a section view as taken along the line 3—3 of FIG. 1.

As shown in FIG. 3, hopper 12 has an intermediate partition or floor unit 74. Partition 74 has a top plate 76, front and rear plates 78, 80, and left and right plates 82, 84. Plates 78, 80, 82, 84 have respective cantilever support rods 86, 88, 90, 92. Rods 86, 88, 90, 92 are respectively supported by inclined walls 62, 64, 66, 68. Partition 74 forms slots 94, 96, 98, 100 with respective inclined walls 62, 64, 66, 68. Powder 24 passes through slots 94, 96, 98, 100 from an upper part of chamber 16 to space 18. Powder 24 forms an arch over each of the slots 94, 96, 98, 100. Some of the powder 24 passes through slots 94, 96, 98, 100, due to vibration of hopper 12 which is caused by vibrator unit 28.

Inlet pipe unit 20 connects to a compressed air pipe 102 at a connector 104. Air pipe 102 connects to a tee pipe 106 at a connector 108. Tee pipe 106 connects to a vibrator pipe 109 at connector 111. Tee pipe 106 also connects to a shut off valve 110, which has a handle 107. Shutoff valve 110 connects through a pipe 112 to air source 30.

Inlet pipe unit 20 also has a bend portion 114, which connects to pipe 102 at connector 104. Bend portion 114 is fixedly connected to a nozzle pipe 22, at point 115.

Figure 4:
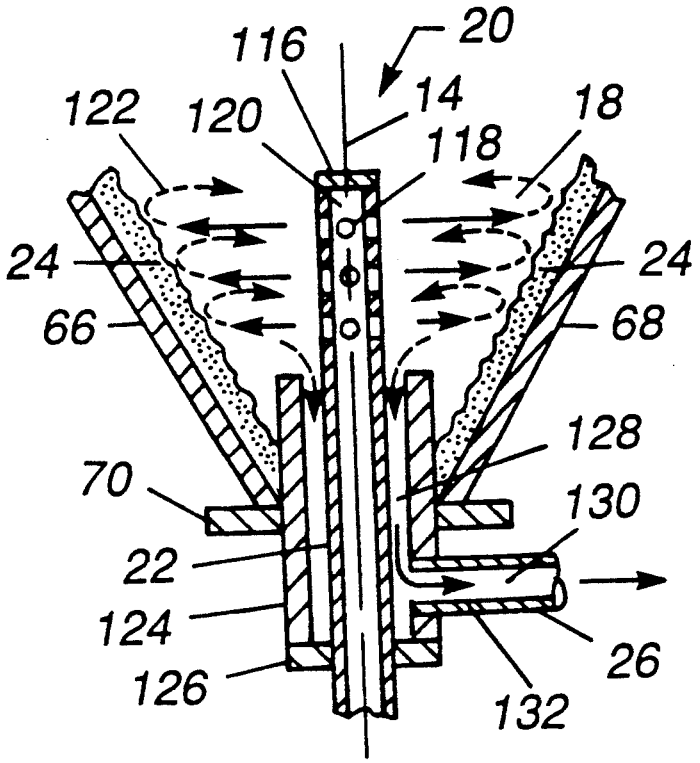
FIG. 4 is a section view as taken along the line 4—4 of FIG. 2.

As shown in FIG. 4, nozzle pipe 22 has a top closure or plate 116, and has a plurality of holes 118. In this embodiment, there are twelve holes, which are arranged in four vertical columns at a peripheral spacing of ninety degrees. There are three holes in a vertical column. Nozzle pipe 22 has an inner passage 120, which feeds compressed air to the plurality of holes 118. Holes 118 are each 0.040 inches in diameter and are spaced one inch center to center vertically in this embodiment. Nozzle pipe 22 has a one-quarter inch inside diameter.

As shown in FIG. 4, outlet pipe unit 26 receives a fluid flow 122 from each nozzle hole 118. Air leaves each hole 118 as a jet and impacts a portion of the surface of powder 24, thereby fluidizing the powder 24. The fluidized powder leaves space 18 through outlet pipe unit 26.

Outlet pipe unit 26 has a vertical pipe 124, which is disposed coaxially around nozzle pipe 22. Vertical pipe 124 has a bottom closure or welded plate 126, through which nozzle pipe 22 extends and which is welded to nozzle pipe 22. Outlet pipe unit 26 has an annular outer passage 128, which surrounds nozzle pipe 22. Passage 128 connects to a passage 130 of an exit side pipe 132. Plate 126 is welded to pipe 124. Pipe 132 is welded to pipe 124. Pipe 124 is welded to wall 70. Pipe 22 is welded to plate 126. Pipe 124 has a three-quarter inch inside diameter in this embodiment. Pipe 124 and pipe 132 can alternately be made as a one-piece casting.

As shown in FIG. 1, exit pipe 132 connects through a hose or pipe 134 to ejector 32. Pipe 134 has opposite end bands 136, 138.

Vibrator unit 28 has a back plate 140, which is attached to hopper plate 58. Vibrator unit 28 has a rotator 142, which is connected to air input pipe 109. Rotator 142 also has an output port 144.

In operation, compressed air from source 30 travels through pipe 112 and valve 110, when open, to tee unit 106. Then, air travels through pipe 109 to vibrator 28, which causes hopper 12 to vibrate. Also, air travels from tee unit 106 through pipe 102 and pipe bend 114 to nozzle pipe 22. Air jets then leave nozzle holes 118 and impact portions of powder 24, causing fluidized powder fluid flow 122 in space 18. Then, fluidized powder passes out through passage 128 and through passage 130 and then through pipe 134 to ejector 32, which sprays out the fluidized powder, forming a smoke screen.

The advantages of apparatus 10 are indicated hereafter.

A) The weight to volume ratio of apparatus 10 is reduced as compared to the prior art device or system.

B) The number of components of apparatus 10 is reduced as compared to the prior art system.

C) The construction cost and maintenance cost and repair cost and operating cost and overall weight of apparatus 10 are minimized as compared to the similar costs of the prior art system.

D) The apparatus 10 can be provided on a greater variety of vehicles and equipment than the prior art system.

E) The amount of energy consumed for operating apparatus 10 is less than the corresponding amount of energy consumed for operating the prior art system.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. An obscurant apparatus comprising:

a hopper having a chamber with an axis and with a fluidizing space for fluidizing a powder-like material;

a compressed air inlet pipe unit having a coaxial nozzle pipe with an inlet passage to the space; and a fluid outlet pipe unit having a coaxial outlet pipe forming an outlet passage around the nozzle pipe;

a vibrator unit for moving the powder-like material into the fluidizing space by vibrating the hopper;

a compressed air source connecting to the nozzle pipe and to the vibrator unit; and an ejector connecting to the outlet pipe for receiving the fluidized powder-like material and for dispensing a smoke screen.

2. The apparatus of claim 1, including a support structure for the hopper.

3. The apparatus of claim 1, wherein the inlet pipe unit has a pipe connecting to an outlet of a tee pipe which connects through a shut-off valve to the compressed air source; and the vibrator unit has a pipe connecting to a second outlet of the tee pipe and has an outlet port and is mounted on the hopper.

4. The apparatus of claim 1, wherein the outlet pipe unit has a pipe connecting to the ejector.

5. The apparatus of claim 1, wherein the nozzle pipe has a top and closure and has a plurality of side holes for forming air jets to impact some of the powder-like material in the fluidizing space for forming a fluid flow through the space and the outlet passage; and the outlet pipe has a bottom portion connecting to the nozzle pipe for supporting the nozzle pipe and has a side exit pipe portion with an exit passage connecting the outlet passage to the ejector.

6. The apparatus of claim 1, wherein the hopper has a top latched wall and has an upper vertical wall assembly and has a lower inclined wall assembly and has a bottom wall;

said bottom wall supporting the outlet pipe; and said outlet pipe supporting the nozzle inlet pipe.

7. The apparatus of claim 6, wherein the upper vertical wall assembly has an overpressure relief valve.

8. The apparatus of claim 6, wherein the hopper has a partition plate assembly supported on the lower inclined wall assembly and comprising:

a plurality of inclined plates forming a plurality of slots with the inclined walls through which some of the powder-like material can pass into the fluidizing space due to vibration of the inclined plates and the inclined walls:

said inclined plates each having a cantilever elongate member fixedly connected at one end thereof to the inclined plate and bearing at an opposite and thereof on an inclined wall adjacent thereto.

* * * * *